United States Patent
Adamson et al.

(10) Patent No.: US 6,243,433 B1
(45) Date of Patent: *Jun. 5, 2001

(54) CLADDING FOR USE IN NUCLEAR REACTORS HAVING IMPROVED RESISTANCE TO STRESS CORROSION CRACKING AND CORROSION

(75) Inventors: Ronald Bert Adamson, Freemont; Daniel Reese Lutz, San Jose, both of CA (US); Mickey Orville Marlowe, Wilmington, NC (US); John Frederick Schardt, Wilmington, NC (US); Cedric David Williams, Wilmington, NC (US)

(73) Assignee: General Electic Co., Schenectady, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/312,021

(22) Filed: May 14, 1999

(51) Int. Cl.$^7$ ................ G21C 3/07; G21C 3/20
(52) U.S. Cl. .......... 376/417; 376/416; 376/305
(58) Field of Search .................... 376/410, 414, 376/416, 417, 428, 305; 420/422; 148/672

(56) References Cited

U.S. PATENT DOCUMENTS

| | | | |
|---|---|---|---|
| 3,969,186 | * 7/1976 | Thompson et al. | 176/91 R |
| 4,045,288 | 8/1977 | Armijo | 176/82 |
| 4,200,492 | 4/1980 | Armijo et al. | 176/82 |
| 4,717,428 | * 1/1988 | Comstock et al. | 148/11.5 |
| 4,933,136 | * 6/1990 | Foster et al. | 376/416 |
| 5,539,791 | 7/1996 | Garzarolli et al. | 376/417 |

FOREIGN PATENT DOCUMENTS 2119559   11/1983  (GB) .............................. G21C/3/20

OTHER PUBLICATIONS

Siemens—Legal Fuel Assembly News—Jun. 1994—Article Entitled "Iron–Alloyed Zirconium Liner Reduces Risk of Serious Secondary Damage to Cladding Tubes"—12 pages.

Nuclear News—Apr. 1995—Article Entitled: "Protecting Fuel Assemblies From Corrosion"—pp. 36–37 by Siebold, Steinberg, Krug and Woods.

* cited by examiner

*Primary Examiner*—Charles T. Jordan
*Assistant Examiner*—Kyongtaek K. Mun
(74) *Attorney, Agent, or Firm*—McNees, Wallace & Nurick; Carmen Santa Maria; Brian T. Sattizahn

(57) ABSTRACT

An improved fuel element for use in a nuclear reactor comprised of a central core of nuclear material, which is surrounded by a composite cladding. The cladding has an outer metallic tubular portion comprised of well-known cladding alloys used for such purposes. Metallurgically bonded to the outer metallic tubular portion is a commercially pure zirconium microalloyed with a controlled quantity of iron. The zirconium microalloyed with iron produced an inner metallic barrier having a beneficial balance between stress corrosion crack resistance and corrosion resistance while retaining other beneficial properties of pure zirconium, such as ductility.

16 Claims, 3 Drawing Sheets

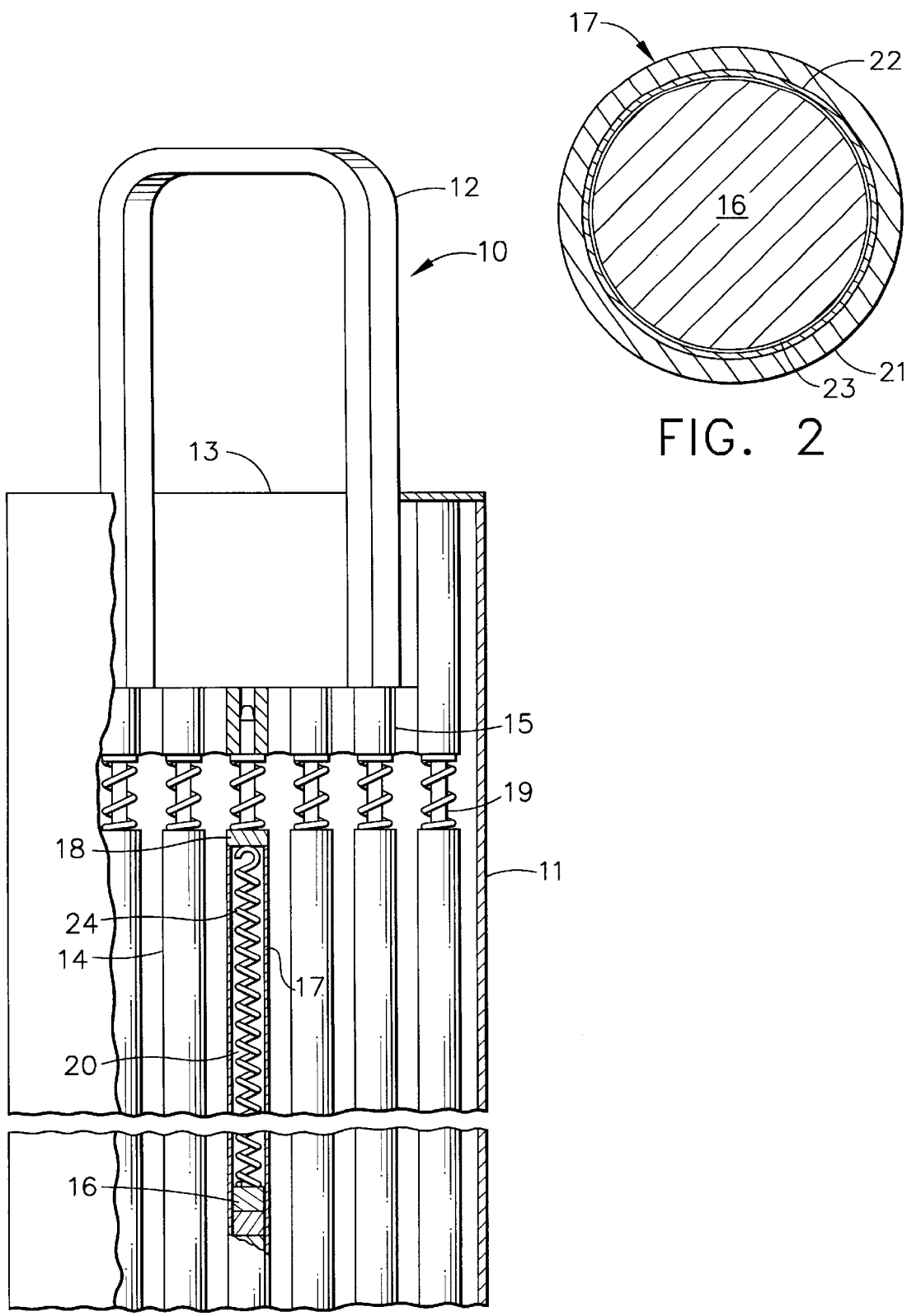

CLADDING FOR USE IN NUCLEAR REACTORS HAVING IMPROVED RESISTANCE TO STRESS CORROSION CRACKING AND CORROSION

FIELD OF THE INVENTION

This invention relates broadly to improvements in nuclear fuel elements for use in the core of nuclear fission reactors and specifically, to improved nuclear fuel elements for use in boiling water reactors having improved stress corrosion cracking resistance and improved inner surface corrosion resistance.

BACKGROUND OF THE INVENTION

Standard parts of nuclear reactors are the fuel elements forming the core of the reactor that contains the nuclear fuel. Although the fuel elements may assume any one of a number of geometric cross-sections, the elements are comprised of nuclear fuel enclosed by cladding. The cladding is ideally corrosion resistant, non-reactive and heat conductive. Coolant, typically demineralized water, flows in the flow channels that are formed between the fuel elements to remove heat from the core. One of the purposes of the cladding is to separate the nuclear material of the fuel from the coolant. Another purpose of the cladding is to minimize or prevent the radioactive fission products from contacting the coolant and thereby being spread throughout the primary cooling system. However, over time different cladding designs have failed by a number of failure mechanisms.

In order to accomplish these and other purposes, various materials and combinations of materials have been used in the cladding. The most common cladding materials include zirconium and alloys of zirconium, stainless steel, aluminum and its alloys, niobium and other materials. Of these, zirconium and its alloys have proven to be excellent materials for such purposes in water reactors because of material properties suited for cladding, including good heat conductivity, good strength and ductility, low neutron absorptivity and good resistance to corrosion.

One composite system utilizes an inner lining of stainless steel metallurgically bonded to zirconium alloy. The disadvantage of this system is that the stainless steel develops brittle phases that ultimately crack, allowing the by-products of the fission to contact the zirconium alloy cladding, initiating the deterioration of the zirconium alloy outer cladding. Furthermore, the stainless steel layer has a neutron absorption penalty of ten to fifteen times the penalty for a zirconium alloy of the same thickness. A solution to the problem of cladding failure is set forth in U.S. Pat. No. 3,969,186 which sets forth a composite consisting of refractory metals such as molybdenum, tungsten, rhenium, niobium and alloys of these materials in the form of a tube or foil of single or multiple layers or a coating on the internal surface of the cladding.

Still another solution to the problem is set forth in U.S. Pat. No. 4,045,288 that teaches the use of a composite cladding of zirconium alloy substrate with a sponge zirconium liner. The concept is that the commercially pure, soft, ductile zirconium liner minimizes the localized strain that the outer cladding is subject to. However, if a breach in the outer cladding should occur, allowing water and/or steam to enter the fuel rod, the zirconium liner tends to oxidize rapidly.

Yet another approach to the problem of cladding failure set forth in U.S. application Ser. No. 06/374,052 filed May 3, 1982, assigned to the assignee of the present application, and incorporated herein by reference, teaches using a composite cladding consisting of a dilute zirconium alloy inner liner metallurgically bonded to conventional cladding materials such as zirconium alloy claddings. The dilute zirconium alloy inner liner includes at least one metal alloyed with the zirconium selected from the group consisting of iron, chromium, iron plus chromium and copper. The amount of iron alloyed with the zirconium is from about 0.2% to about 0.3% by weight; the amount of chromium is from about 0.05% to about 0.3% by weight; the total amount of iron plus chromium is from about 0.15% to about 0.3% by weight and wherein the ratio of the weights of iron to chromium is in the range of from about 1:1 to about 4:1; and wherein the amount of copper is from about 0.02% to about 0.2% by weight.

While advances have been made in the area of improving the performance of claddings, corrosion and brittle splitting of the cladding due to interactions of the cladding, the nuclear fuel, the fission products and the coolant continues to be a problem even with the improved systems.

SUMMARY OF THE INVENTION

A particularly effective nuclear fuel element is comprised of a central core of a nuclear fuel material. The nuclear material may be any radioactive materials, such as the well known radioactive materials of uranium, plutonium, thorium and mixtures thereof.

The central core of nuclear fuel material is surrounded by an elongated composite cladding comprised on an inner metallic barrier and an outer metallic tubular portion. The outer portion of the cladding is unchanged in design and function from the previous practices utilized in the nuclear reactor arts. The outer metallic tubular portion remains the standard, well-known materials conventionally used in cladding, and in particular, as outer portions of composite claddings. The outer metallic portion is selected from the group consisting of zirconium and its alloys, stainless steel, aluminum and its alloys, niobium and magnesium alloys.

The inner metallic barrier is zirconium in which the amount of Fe is microalloyed with the zirconium in a controlled amount of from about 850–2500 parts per million by weight (ppm). The inner metallic barrier is metallurgically bonded to the outer metallic tubular portion, but unlike the outer metallic portion when comprised of zirconium or its alloys, is alloyed only with carefully controlled amounts of iron. Trace elements in an amount so as not to affect the character and nature of the inner metallic barrier may be present.

Surprisingly, by carefully controlling the amount of iron present in the zirconium, it has been discovered that the inner metallic barrier not only has greatly improved corrosion resistance over previous claddings and barriers but also improved stress corrosion cracking resistance, while the other important characteristics of the zirconium inner metallic barrier are unaffected. The barrier is ductile, compatible with the outer metallic tubular portion, but has low neutron absorptivity, yet is highly resistant to radiation hardening while maintaining good heat transfer characteristics..

It is believed that the present invention improves the ability of the fuel element to operate normally in the failed condition, that is, with the failure of the outer cladding due to primary defects developed as a result of stress corrosion or fretting, but without developing secondary long axial cracks along the inner barrier. The inner metallic barrier has sufficient corrosion resistance such that it will continue to provide an effective barrier when exposed to the nuclear fuel and the by-products of nuclear fission as well as the coolant, which may include demineralized water, steam and/or moderators. The life expectancy of the fuel element is increased, even after failure of the outer cladding, due to the ability of the inner metallic barrier to slow down the formation of corrosion products (hydrides) upon contact with coolant.

Other features and advantages of the present invention will be apparent from the following description and the preferred embodiment, taken in conjunction with the accompanying drawings which illustrate, by way of example, the principles of the invention.

BRIEF DESCRIPTION OF THE DRAWINGS

FIG. 1 is a partial cutaway section of a nuclear fuel assembly containing nuclear fuel elements constructed according to the teaching of this invention;

FIG. 2 is an enlarged transverse cross-sectional view of the nuclear fuel element of FIG. 1, illustrating the teaching of this invention.

DETAILED DESCRIPTION OF THE PREFERRED EMBODIMENTS

Figure 3:
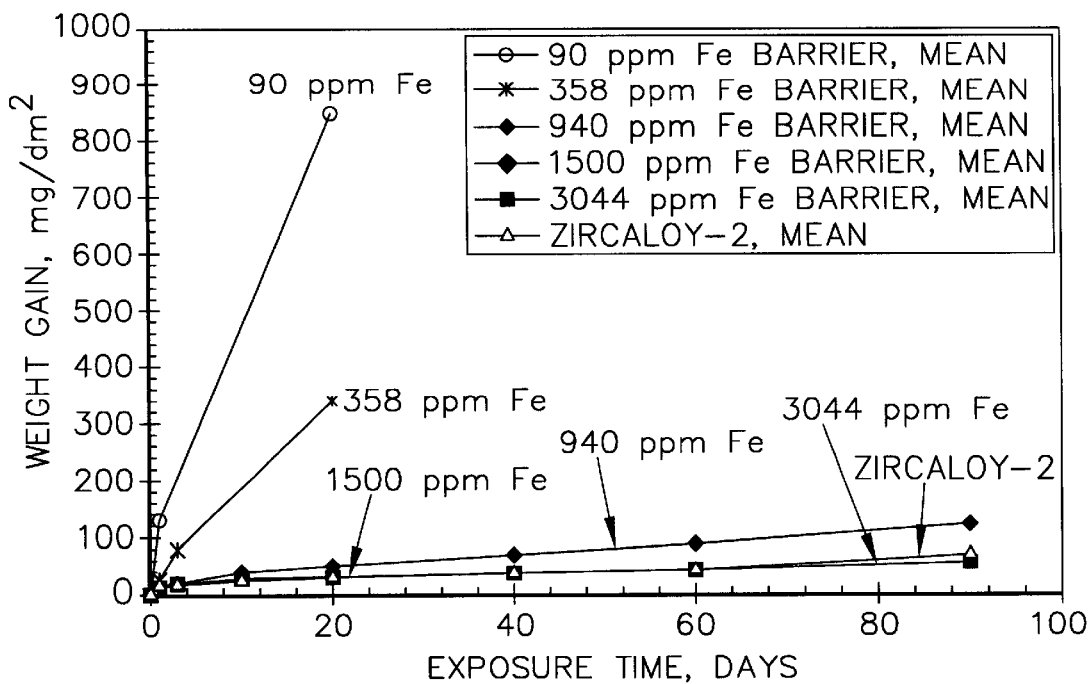
FIG. 3 is a graph of the corrosion of zirconium having varying amounts of iron over an exposure time in days.

Referring now more particularly to FIG. 1, there is shown a partially cutaway sectional view of a nuclear fuel assembly 10. This fuel assembly 10 consists of a tubular flow channel 11 of generally square cross-section provided in its upper end with a lifting bale 12, and at its lower end, with a nose piece (not shown due to the lower portion of assembly 10 being omitted). The upper end of channel 11 is open at outlet 13 and the lower end of the nose piece is provided with cooling flow openings. An array of fuel elements or rods 14 is enclosed in the channel 11 and supported therein by means of an upper end plate 15 and a lower end plate (not shown due to the lower portion being omitted). The liquid coolant ordinarily enters through the openings in the lower end of the nose piece, passes upwardly around fuel elements 14, and discharges through the upper outlet 13 at an elevated temperature in a partially vaporized condition for boiling reactors or in an unvaporized condition for pressurized water reactors.

The nuclear fuel elements or rods 14 are sealed at their ends by means of end plugs 18 welded to the composite cladding 17, which may include studs 19 to facilitate the mounting of the fuel rod in the assembly. A void space or plenum 20 is provided at one end of the element to permit longitudinal expansion of the fuel material and accumulation of gases released from the fuel material. A nuclear fuel material retainer means 24 in the form of a helical member if positioned within space 20 to provide restraint against the axial movement of the pellet column, especially during handling and transportation of the fuel element.

The fuel element is designed to provide excellent thermal contact between the cladding and the fuel material, a minimum amount of parasitic neutron absorption, and resistance to bowing and vibration which is occasionally caused by flow of the coolant at high velocity.

A nuclear fuel element or rod 14 constructed according to the teachings of this invention is shown in a partial section in FIG. 1. The fuel element includes a core or central cylindrical portion of nuclear fuel material 16, here shown as a plurality of fuel pellets or fissionable and/or fertile materials positioned within a structural composite cladding of container 17. In some cases, the fuel pellets may be of various shapes, such as cylindrical pellets or spheres. In other cases, different fuel forms, such as particulate fuel, may be used. The physical form of the fuel is immaterial to this invention. Various nuclear fuel materials may be used including uranium compounds, plutonium compounds, thorium compounds, and mixtures thereof. The preferred fuel is uranium dioxide or a mixture comprising uranium dioxide and plutonium dioxide.

Referring now to FIG. 2, the nuclear fuel material 16 forming the central core of the fuel element 14 is surrounded by composite cladding 17, which, in this invention, is also referred to as a composite cladding container. The composite cladding container, generally elongated in shape, encloses the fissile core. A gap 23 is optional between the core and the composite cladding 17 and may or may not be present. The composite cladding container has an external substrate or outer metallic tubular portion 21 selected from conventional cladding materials such as stainless steel and zirconium alloys. In the preferred embodiment of this invention, the outer metallic tubular portion 21 is a zirconium alloy such as Zircaloy-2, currently the preferred alloy in the outer portion, Zircaloy-4 and other zirconium alloy improvements.

Metallurgically bonded to the outer metallic tubular portion of the container is an inner metallic barrier. This inner metallic barrier is positioned to prevent contact between the nuclear fuel and the outer metallic tubular portion. The inner metallic barrier is comprised of commercially pure zirconium microalloyed with iron (Fe). The amount of Fe is carefully controlled so as not to be under a lower value of 850 parts per million (ppm) and not to exceed an upper value of 2500 ppm. As set forth in U.S. Pat. No. 4,200,492, production of commercially pure zirconium having trace impurities is well-known. The normal range of these impurities include aluminum (Al) in the amounts of 75 ppm or less; boron (B) in the amounts of 0.4 ppm or less; cadmium (Cd) in the amounts of 0.4 ppm or less; carbon (C) in the amounts of 270 ppm or less; chromium (Cr) in the amounts of 200 ppm or less; cobalt (Co) in the amounts of 20 ppm or less; copper (Cu) in the amounts of 50 ppm or less; hafnium (Hf) in the amounts of 100 ppm or less; hydrogen (H) in the amounts of 25 ppm or less; magnesium (Mg) in the amounts of 20 ppm or less; manganese (Mn) in the amounts of 50 ppm or less; molybdenum (Mo) in the amounts of 50 ppm or less; nickel (Ni) in the amounts of 70 ppm or less; niobium (Nb) in the amounts of 100 ppm or less, nitrogen (N) in the amounts of 80 ppm or less; tungsten (W) in the amounts of 100 ppm or less; silicon (Si) in the amounts of 120 ppm or less; tin (Sn) in the amounts of 50 ppm or less; titanium (Ti) in the amounts of 50 ppm or less and uranium in the amounts of 3.5 ppm or less. The prior art practice has treated Fe as a trace element which may be present in the amounts of 1500 ppm or less.

The discovery of this invention has been that by controlling the amount of Fe as a microalloyed addition to the commercially pure zirconium, an inner metallic barrier having a beneficial balance between stress corrosion crack resistance and corrosion resistance resulting in an improved alloy can be produced. While iron has been present as a trace or tramp element in the past, the amount of iron has only been controlled as a maximum permissible amount, so that erratic results in performance occurred because there was no appreciation of controlling the composition of the Fe within the limits set forth by the present invention to achieve the improved beneficial balance between stress corrosion crack resistance and corrosion resistance.

It has been discovered that the corrosion resistance and the stress corrosion crack resistance of commercially pure zirconium can be balanced by micro alloying it with Fe in the amounts from about 850 ppm to about 2500 ppm. The incidental impurities as set forth above can remain at the levels as previously set forth without adversely affecting the beneficial aspects of the present invention.

Figure 5:
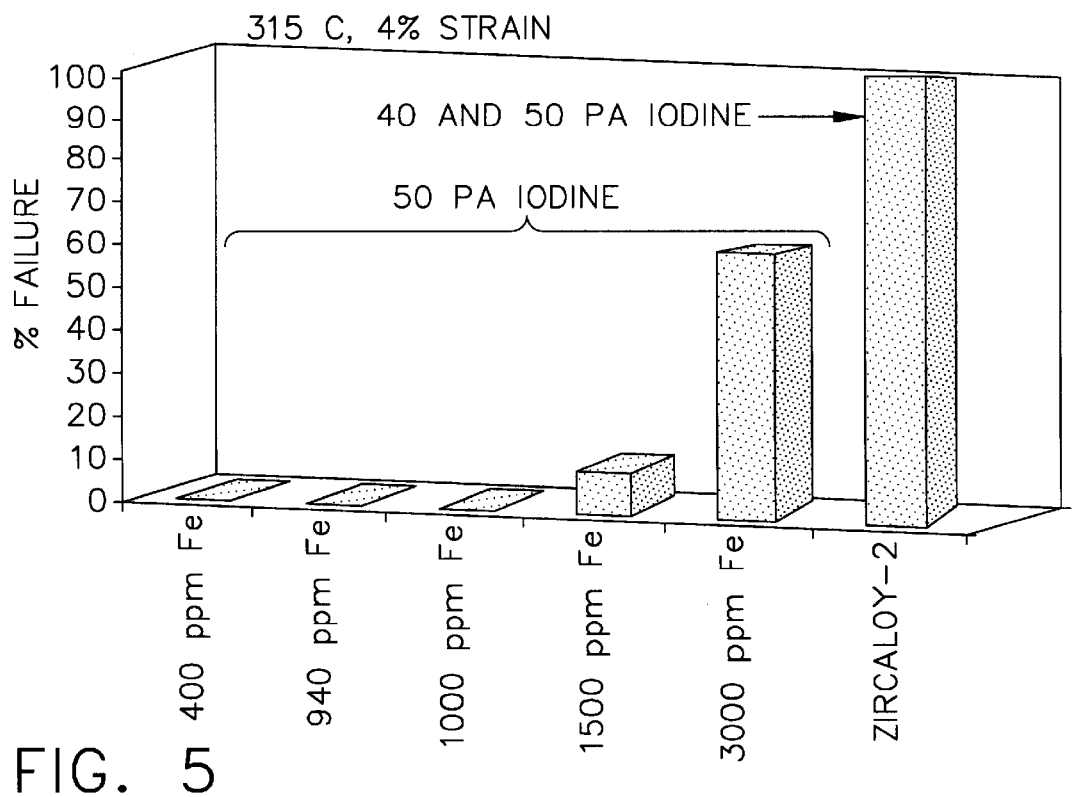
FIG. 5 is a graph depicting the results of PCI resistance testing of zirconium microalloyed with varying amounts of iron.

The Assignee of the present invention has found that the expanding mandrel test as set forth above, can discriminate between and among varying stress corrosion cracking susceptibility of alloys. When the stress-strain conditions generated by various industry testing techniques reflect actual fuel rod conditions, similar discrimination should result from such tests. FIG. 5 and the data of Table 1 indicate that at and below about 1000 ppm Fe the PCI resistance is perfect, which is to say that no tests produced failure. At about 1500 ppm Fe, there is a transition to decreasing PCI resistance. At about 3000 ppm Fe, about 60% of the tests produced failure, which is an unsatisfactory result.

TABLE 1

| Material | 400 ppm Fe Barrier | 940 ppm Fe Barrier | 1000 ppm Fe Barrier | 1500 ppm Fe Barrier | 3000 ppm Fe Barrier | Zircaloy-2 Non-Barrier | Zircaloy-2 Non-Barrier |
| --- | --- | --- | --- | --- | --- | --- | --- |
| Failure % | 0 | 0 | 0 | 10 | 60 | 100 | 100 |
| # Tests | 3 | 10 | 10 | 10 | 10 | 7 | 9 |
| Iodine Pressure (Pa) | 50 | 50 | 50 | 50 | 50 | 40 | 50 |

Figure 4:
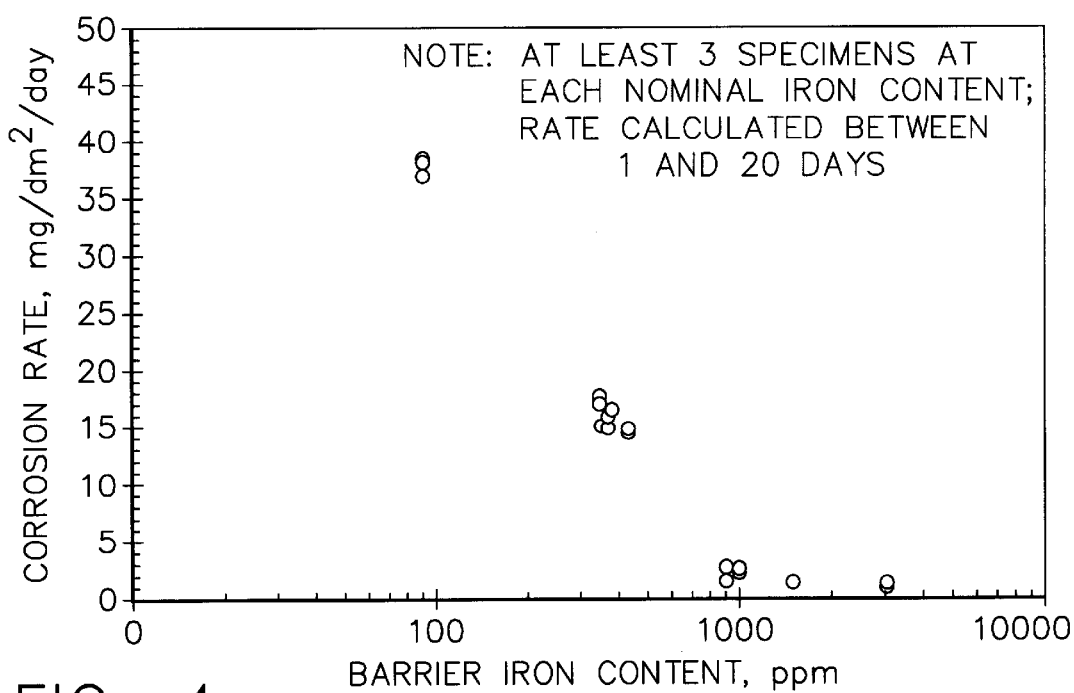
FIG. 4 is a graph of the corrosion rate of zirconium versus microalloyed amounts of iron.

Referring now to FIGS. 3 and 4, the corrosion resistance of Zr is related to the Fe content present in the Zr. FIG. 3 is a graph of the corrosion resistance of zirconium having varying amounts of Fe content as measured by weight gain over a period of time in 400° C. (750° F.) steam as set forth by a modified test based on the ASTM G2 Steam Test. The modification consists of extending the time of the ASTM G2 Stream Test. FIG. 4 is a graph showing the effect of increasing iron content on the corrosion rate of Zr in 400° C. steam. Clearly, there is a correlation between Fe content and the corrosion of Zr in 400° C. steam. Between about 100 and 400 ppm Fe, the corrosion rate of the Zr drops from about 35 mg/dm$^2$/day to about 15 mg/dm$^2$/day. At about 800 ppm to about 850 ppm Fe the corrosion rate is significantly reduced, exhibiting a decay approaching 0 asymptotically. As indicated by FIG. 3, small increases in iron from about 360 ppm to 940 ppm significantly reduce the corrosion of the Zr. Above about 940 ppm, although increasing the Fe content improves the corrosion resistance of the Zr slightly, the improvement is a diminishing function of increased Fe. It appears that the saturation in corrosion rate improvement occurs at about 1500 ppm. Thus, it is important to maintain the Fe levels in the Zr above the minimum amounts of about 850 ppm and preferably above about 1000 ppm and most preferably above about 1500 ppm in order to take advantage of the corrosion resistance of the microalloyed Fe. As the amount of microalloyed Fe in Zr drops below about 850 ppm, the corrosion resistance of the inner barrier begins to deteriorate dramatically. Thus, it can be seen that the life of an inner barrier having less than the critical amount of Fe will be shortened, resulting in a failure.

Referring now to FIG. 5, the resistance of Zr to stress corrosion cracking is also related to the Fe content of the Zr. Resistance to stress corrosion cracking is measured by a test using an expanding mandrel in an iodine environment. The test simulates the ability of a fuel rod to resist the in-reactor failure mechanism called pellet cladding interaction (PCI) and is referred to as PCI resistance testing. The test is performed using a ramp and hold expanding mandrel, with a 4% strain rate at 315° C. (662° F.). There is no standard industry test, although various tests are used in the industry.

From these two tests, it can be seen that even though cracking resistance is excellent below about 850 ppm Fe, the corrosion resistance at this Fe level is unacceptable. At or above 850 ppm Fe, the corrosion level is acceptable. At about 1500 ppm Fe, the crack resistance begins to deteriorate, trending towards unacceptable levels, even though the corrosion resistance is excellent. Thus, even though there may be some small amount of cracking at about 2000 ppm Fe, it is tolerable since it is not accompanied by corrosion, which would provide a combined failure mechanism, exacerbating the failure of the barrier protection. The inner metallic barrier can have a composition of iron above about 1500 ppm and below about 2000 ppm microalloyed with commercially pure zirconium. Crack resistance continues to deteriorate and it can be seen from the graphs of FIGS. 5 and 6 that it becomes unacceptable in the range of Fe between about 2500 and 3000 ppm.

Figure 6:
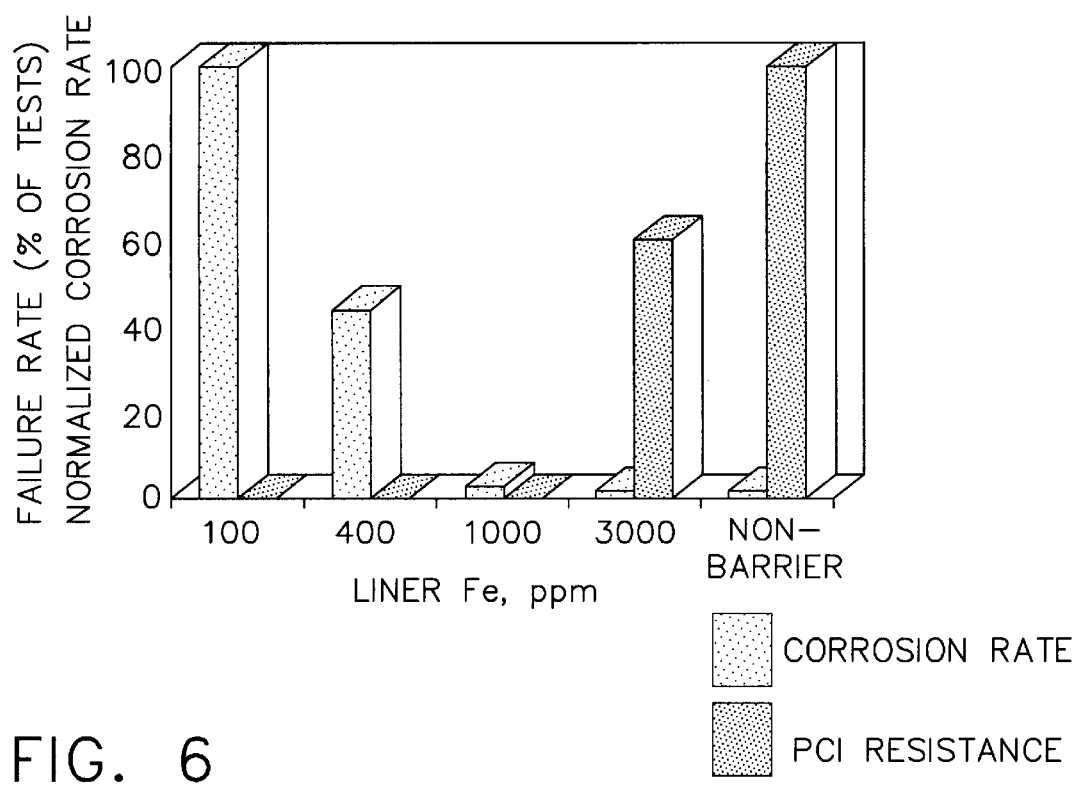
FIG. 6 is a graph depicting the combined corrosion rate the PCI resistance testing results of a function of microalloyed concentration of iron in zirconium.

FIG. 6 is a graph that depicts both the corrosion rate and the PCI resistance as a function of the Fe content of the barrier. It can be seen from this graph that Fe in a range of from about 1000 to about 2000 ppm produces both acceptable corrosion rates and tolerable PCI resistance. Referring to Table 1 and FIGS. 3–6, since a slight increase in PCI cracking can be tolerated, another embodiment of the invention will include Fe in the range of about 850–2000 ppm microalloyed with commercially pure Zr. In a preferred embodiment of the invention, Fe is included in the range of about 1000–2000 ppm. The most preferred embodiment includes 1000±150 ppm Fe-microalloyed with Zr. The Zr microalloyed with Fe will retain the ductility that is desirable in an inner metallic barrier. Because the Fe is controlled in microalloyed amounts, it retains its low neutron absorptivity and good heat transfer characteristics yet is highly resistant to radiation hardening. Ideally, the Zirconium microalloyed with Fe is metallurgically bonded to the outer metallic tubular portion 21, preferably Zircaloy-2, but is recrystallized having a grain size in the range of ASTM 9 to ASTM 12. The inner metallic barrier 22 typically and preferably comprises between about 10% to about 20% of the total thickness of the composite cladding 17. However, the thickness of inner metallic barrier 22 can be varied outside this prescribed thickness range as long as neither the integrity of the outer metallic tubular portion 21 nor the ability of the inner metallic portion 22 to function as a barrier is adversely affected. The composite cladding 17 can be manufactured by any of the well-known prior art methods for bonding an inner barrier of zirconium sponge to an outer barrier of, for example, stainless steel or Zircaloy. Although the present invention has been described in connection with specific examples and embodiments, those skilled in the art will recognize that the present invention is capable of other variations and modifications within its scope. These examples and embodiments are intended as typical of, rather than in any way limiting on, the scope of the present invention as presented in the appended claims.

What is claimed is:

1. A nuclear fuel element, comprising:
    a central core of a body of nuclear fuel material selected from the group consisting of compounds of uranium, plutonium, thorium and mixtures thereof; and,
    an elongated composite container having a hollow central bore, the container comprised of an outer metallic tubular portion and an inner metallic barrier metallurgically bonded to the outer metallic tubular portion, the inner metallic barrier having a combination of crack resistance and corrosion resistance consisting essentially of commercially pure zirconium microalloyed with iron in the range of about 850–1500 ppm and the balance incidental impurities.

2. The nuclear fuel element of claim 1 wherein the inner metallic barrier having a combination of acceptable cracking resistance and superior corrosion resistance consists essentially of iron in a range of about 1000±150 ppm.

3. The nuclear fuel element of claim 1 wherein the corrosion resistance of the inner metallic barrier as measured by the modified ASTM G2 steam test is less than about 5 mg/dm$^2$/day.

4. The nuclear fuel element of claim 1 wherein the thickness of the inner metallic barrier is about 10–20% of the total thickness of the elongated composite cladding container.

5. The nuclear fuel element of claim 1 wherein the cracking resistance of the inner metallic barrier measured by PCI resistance testing at 315° C. has a failure rate of 50% or less.

6. The nuclear fuel element of claim 1 wherein the nuclear fuel material is selected from the group consisting of compounds of uranium, plutonium, thorium and mixtures thereof.

7. The nuclear fuel element of claim 1 wherein the microstructure of the inner metallic barrier is recrystallized, having a grain size in the range of ASTM 9 to ASTM 11.

8. The nuclear fuel element of claim 2 wherein the microstructure of the inner metallic barrier is recrystallized, having a grain size in the range of ASTM 9 to ASTM 12.

9. The nuclear fuel element of claim 1 wherein the outer metallic tubular portion is selected from the group consisting of zirconium and its alloys, stainless steel, aluminum and its alloys, niobium and magnesium alloys.

10. The nuclear fuel element of claim 9 wherein the outer metallic tubular portion is comprised of zirconium and its alloys.

11. The nuclear fuel element of claim 10 wherein the inner metallic barrier consists essentially of iron in the range of about 850–1500 ppm, and the weight percent of zirconium in the inner metallic barrier is greater than the weight percent of zirconium in the outer metallic tubular portion.

12. The nuclear fuel element of claim 1 in which the inner metallic barrier consists essentially of iron in the range of about 1000–1500 ppm.

13. The nuclear fuel element of claim 12 wherein the microstructure of the inner metallic barrier is recrystallized, having a grain size in the range of ASTM 9 to ASTM 12.

14. The nuclear fuel element of claim 12 wherein the cracking resistance of the inner metallic barrier measured by PCI resistance testing at 315° C. has a failure rate of 10% or less.

15. The nuclear fuel element of claim 14 wherein the corrosion resistance of the inner metallic barrier as measured by the modified ASTM G2 steam test is about 2 mg/dm$^2$/day.

16. The nuclear fuel element of claim 15 wherein the inner metallic barrier comprises about 10 to about 20% of the total composite container thickness.

* * * * *